(12) United States Patent
Cherukuri et al.

(10) Patent No.: US 9,588,575 B2
(45) Date of Patent: *Mar. 7, 2017

(54) LINK POWER SAVINGS WITH STATE RETENTION

(71) Applicant: Intel Corporation, Santa Clara, CA (US)

(72) Inventors: Naveen Cherukuri, San Jose, CA (US); Jeffrey Wilcox, Boulder Creek, CA (US); Venkatraman Iyer, Round Rock, TX (US); Selim Bilgin, Hillsboro, OR (US); David S. Dunning, Portland, OR (US); Robin Tim Frodsham, Hillsboro, OR (US); Theodore Z. Schoenborn, Portland, OR (US); Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/321,402

(22) Filed: Jul. 1, 2014

(65) Prior Publication Data
US 2015/0074440 A1 Mar. 12, 2015

Related U.S. Application Data

(63) Continuation of application No. 12/495,706, filed on Jun. 30, 2009, now Pat. No. 8,831,666.

(51) Int. Cl.
*H04B 7/00* (2006.01)
*G06F 1/32* (2006.01)
*H04W 52/02* (2009.01)

(52) U.S. Cl.
CPC .......... *G06F 1/3287* (2013.01); *G06F 1/3296* (2013.01); *H04W 52/0229* (2013.01); *H04W 52/0219* (2013.01); *Y02B 60/50* (2013.01)

(58) Field of Classification Search
CPC ... H04W 52/24; H04W 52/50; H04W 52/367; H04W 52/12; H04W 52/40;
(Continued)

(56) References Cited

U.S. PATENT DOCUMENTS 5,706,110 A 1/1998 Nykanen
5,742,650 A * 4/1998 Nuckolls .................. G06F 1/24
375/373
(Continued)

FOREIGN PATENT DOCUMENTS

CN 1533643 A 9/2004
CN 1599893 A 3/2005
(Continued)

OTHER PUBLICATIONS

State Intellectual Property Office of the People's Republic of China Office Action in Chinese Patent Application Serial No. 201010227120.7 mailed on Dec. 25, 2014.
(Continued)

*Primary Examiner* — Nhan Lee
(74) *Attorney, Agent, or Firm* — Patent Capital Group

(57) ABSTRACT

Methods and apparatus relating to link power savings with state retention are described. In one embodiment, one or more components of two agents coupled via a serial link are turned off during idle periods while retaining link state in each agent. Other embodiments are also disclosed.

20 Claims, 5 Drawing Sheets

(58) Field of Classification Search
CPC ............. H04W 52/02; H04W 52/0229; H04W 52/0225; H04W 52/028
USPC ..... 455/41.2, 68, 69, 507, 522, 550.1, 552.1, 455/553.1, 572, 574; 370/310–318, 338
See application file for complete search history.

(56) References Cited

U.S. PATENT DOCUMENTS

| | | | |
|---|---|---|---|
| 5,790,946 A | 8/1998 | Rotzoll | |
| 5,838,720 A | 11/1998 | Morelli | |
| 6,009,488 A | 12/1999 | Kavipurapu | |
| 6,078,819 A * | 6/2000 | Ciccone | H04M 1/73 375/133 |
| 6,219,564 B1 * | 4/2001 | Grayson | H04B 1/56 370/311 |
| 6,463,542 B1 | 10/2002 | Yu et al. | |
| 6,526,469 B1 | 2/2003 | Drehmel et al. | |
| 6,593,801 B1 | 7/2003 | Hattori | |
| 6,691,071 B2 * | 2/2004 | Kerr | G06F 1/3209 455/352 |
| 6,795,450 B1 | 9/2004 | Mills et al. | |
| 6,993,667 B1 | 1/2006 | Lo | |
| 7,028,199 B2 | 4/2006 | Ayyavu et al. | |
| 7,058,833 B1 | 6/2006 | Bremer et al. | |
| 7,072,697 B2 | 7/2006 | Lappetelainen et al. | |
| 7,146,510 B1 | 12/2006 | Helms | |
| 7,181,188 B2 * | 2/2007 | Vu | H04W 52/0277 455/343.2 |
| 7,197,654 B2 | 3/2007 | Olsen | |
| 7,203,853 B2 | 4/2007 | Martwick | |
| 7,219,220 B2 | 5/2007 | Cherukuri et al. | |
| 7,313,712 B2 | 12/2007 | Cherukuri et al. | |
| 7,389,528 B1 | 6/2008 | Beser | |
| 7,466,996 B2 | 12/2008 | Carballo | |
| 7,570,610 B2 | 8/2009 | Chen | |
| 7,580,715 B2 | 8/2009 | Gorsuch et al. | |
| 7,610,500 B2 | 10/2009 | Cherukuri et al. | |
| 8,107,378 B2 * | 1/2012 | Hsu | H04W 52/0225 370/236 |
| 8,355,759 B2 * | 1/2013 | Karaoguz | H04B 1/1615 455/572 |
| 8,831,666 B2 * | 9/2014 | Cherukuri | G06F 1/3287 370/318 |
| 2002/0132603 A1 | 9/2002 | Lindskog et al. | |
| 2003/0056127 A1 | 3/2003 | Vaglica | |
| 2003/0103521 A1 | 6/2003 | Raphaeli et al. | |
| 2003/0107989 A1 | 6/2003 | Ray | |
| 2003/0198296 A1 | 10/2003 | Bonelli et al. | |
| 2004/0103333 A1 | 5/2004 | Martwick et al. | |
| 2004/0160982 A1 | 8/2004 | Gorsuch et al. | |
| 2005/0025226 A1 | 2/2005 | Mizuguchi et al. | |
| 2005/0188232 A1 | 8/2005 | Weng et al. | |
| 2005/0215227 A1 * | 9/2005 | Vu | H04W 52/0277 455/343.2 |
| 2005/0215274 A1 | 9/2005 | Matson et al. | |
| 2005/0262336 A1 | 11/2005 | Cherukuri et al. | |
| 2005/0262368 A1 | 11/2005 | Cherukuri et al. | |
| 2006/0265611 A1 | 11/2006 | Wang et al. | |
| 2006/0265612 A1 | 11/2006 | Tseng et al. | |
| 2007/0232254 A1 * | 10/2007 | Mackey | G06F 1/3203 455/343.1 |
| 2008/0005636 A1 | 1/2008 | Conrad et al. | |
| 2008/0075107 A1 | 3/2008 | Cherukuri et al. | |
| 2008/0077814 A1 | 3/2008 | Cherukuri et al. | |
| 2008/0091963 A1 | 4/2008 | Cherukuri et al. | |
| 2010/0165896 A1 | 7/2010 | Gong et al. | |
| 2010/0330927 A1 | 12/2010 | Cherukuri et al. | |

FOREIGN PATENT DOCUMENTS

| | | | |
|---|---|---|---|
| CN | 1763696 A | 4/2006 | |
| EP | 1777607 A1 | 4/2007 | |
| TW | 200907693 | 2/2009 | |
| WO | 2011/008326 A1 | 1/2011 | |

OTHER PUBLICATIONS

PCI-SIG, "PCI Express Base Specification", Revision 1.0, Apr. 29, 2002, 33 pages.
International Preliminary Report on Patentability and Written Opinion received for PCT Patent Application No. PCT/US2010/034324, mailed on Jan. 12, 2012, 5 pages.
Notice of Allowance Received for U.S. Appl. No. 10/850,733, mailed on Aug. 10, 2007, 6 pages.
Notice of Allowance Received for U.S. Appl. No. 10/850,783, mailed on Jan. 5, 2007, 15 pages.
Office Action Received for the German Patent Application No. 112010002776.5, mailed on Apr. 19, 2012, 4 pages of Office Action and 5 pages of English Translation.
Office Action Received for the German Patent Application No. 112010002776.5, mailed on Dec. 21, 2012, 16 pages.
Non Final Office Action received for U.S. Appl. No. 10/850,733, mailed on Apr. 11, 2007, 14 Pages.
Restriction Election Requirement received for the U.S. Appl. No. 10/850,733, mailed on Dec. 27, 2006, 7 Pages.
Final Office Action Received for the U.S. Appl. No. 11/949,770, mailed on Nov. 19, 2009, 9 Pages.
Non Final Office Action received for U.S. Appl. No. 11/949,770, mailed on Apr. 3, 2009, 10 Pages.
Notice of Allowance received for U.S. Appl. No. 11/950,292, mailed on Apr. 8, 2007, 11 Pages.
Notice of Allowance received for U.S. Appl. No. 11/950,292, mailed on Jul. 16, 2009, 5 Pages.
Final Office Action received for the U.S. Appl. No. 11/950,314, mailed on Jun. 1, 2010, 8 Pages.
Non Final Office Action received for the U.S. Appl. No. 11/950,314, mailed on Jan. 14, 2010, 7 Pages.
Non Final Office Action received for U.S. Appl. No. 12/495,706, mailed on Jul. 23, 2012, 7 Pages.
Notice of Allowability received for U.S. Appl. No. 12/495,706, mailed on Aug. 4, 2014, 6 Pages.
Notice of Allowance received for U.S. Appl. No. 12/495,706, mailed on Mar. 17, 2014, 7 Pages.
Final Office Action received for U.S. Appl. No. 12/495,706, mailed on Mar. 14, 2013, 8 Pages.
Non Final Office Action received for U.S. Appl. No. 12/495,706, mailed on Sep. 16, 2013, 14 Pages.
Office Action received for Chinese Patent Application No. 201010227120.7, mailed on Jun. 13, 2014, 7 pages of Chinese Office Action and 10 pages of English Translation.
International Search Report and Written Opinion received for PCT Patent Application No. PCT/US2010/034324, mailed on Dec. 17, 2010, 9 Pages.
Office Action received for Chinese Patent Application No. 201010227120.7, mailed on Nov. 25, 2013, 5 Pages of Office Action and 8 pages English Translation.
Office Action received for Chinese Patent Application No. 201010227120.7, mailed on Mar. 5, 2013, 7 Pages of Office Action and 13 Pages of English Translation.
Bhatt, Ajay V., "Creating a Third Generation I/O Interconnect", Technology and Research Labs, Intel Corporation, 2002, pp. 1-8.
Krig, Steve, "PCI Express Provides Enterprise Reliability, Availability, and Serviceability", Initiatives and Technologies, Intel Corporation White Paper, 2003, 8 pages.
Taiwan Patent Office Examiner's Tentative Objections and Search Report in Taiwan Patent Application Serial No. 104137006 mailed on May 9, 2016.
Taiwan Patent Office Action and Search Report dated Jan. 8, 2015 in TW Application Serial No. 99115662.

\* cited by examiner

LINK POWER SAVINGS WITH STATE RETENTION

CROSS-REFERENCE TO RELATED APPLICATIONS

This Application is a continuation (and claims the benefit of priority under 35 U.S.C. §120) of U.S. application Ser. No. 12/495,706, filed Jun. 30, 2009, now issued as U.S. Pat. No. 8,831,666 and entitled LINK POWER SAVINGS WITH STATE RETENTION.

FIELD

The present disclosure generally relates to the field of electronics. More particularly, an embodiment of the invention relates to link power savings with state retention.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may slow down, cause malfunction, or even damage an IC chip. Also, the additional heat may limit usage locations and/or applications of a computing device that includes such chips. For example, a portable computing device may solely rely on battery power. Hence, as additional functionality is integrated into portable computing devices, the need to reduce power consumption becomes increasingly important, for example, to maintain battery power for an extended period of time. Non-portable computing systems also face cooling and power generation issues as their IC components use more power and generate more heat.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
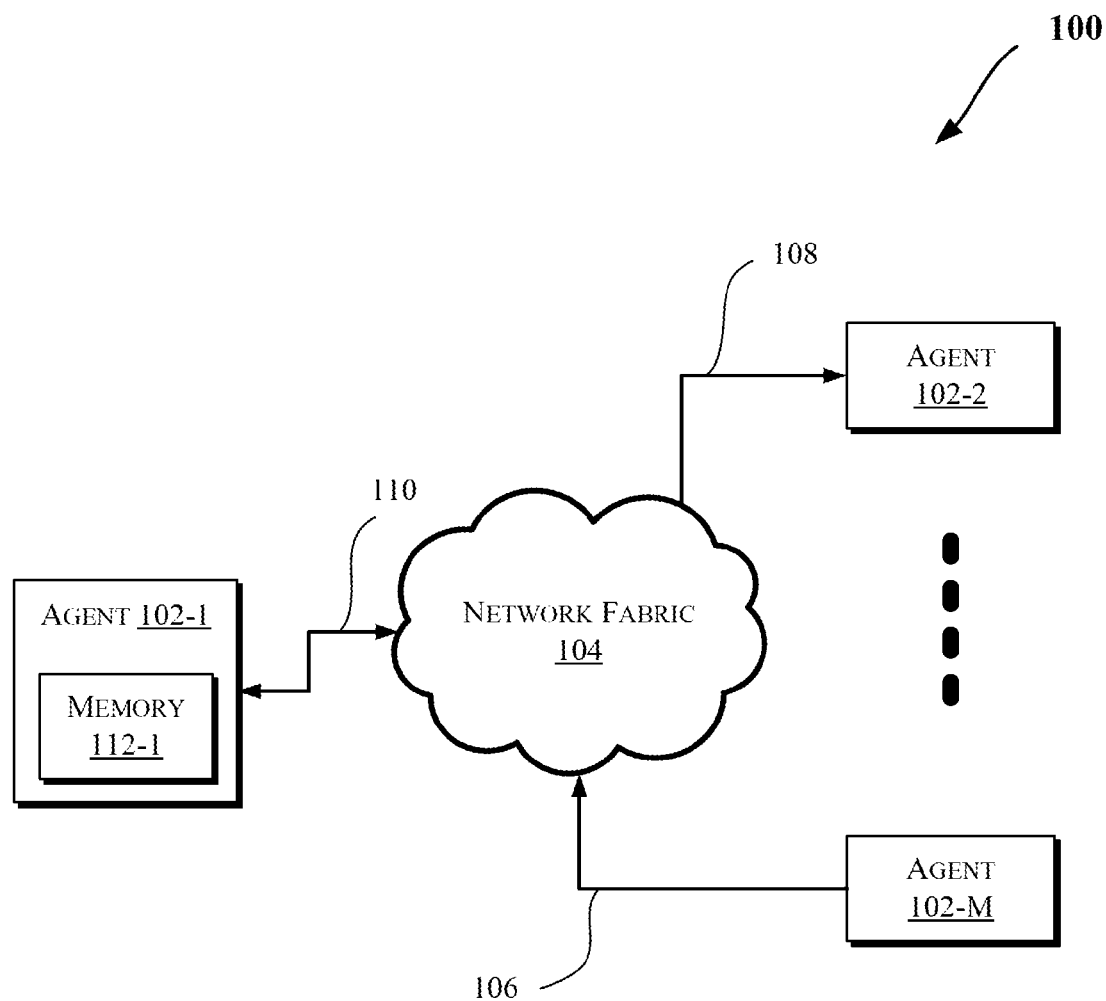
FIGS. 1 and 4-5 illustrate block diagrams of embodiments of computing systems, which may be utilized to implement various embodiments discussed herein.

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. In an embodiment, I/O circuit(s), internal clock(s), and/or a forwarded clock are turned off while retaining link state in internal memory. It should be noted that internal memory used to save state generally has significantly lower power consumption than analog I/O and clocks, and hence results in significant power savings without impacting link resumption.

Some embodiments discussed herein are generally related to reducing power consumption and/or heat dissipation by link(s) (such as point-to-point or serial links) between two agents when the link(s) are idle, e.g., without sacrificing endpoint state. Such techniques may allow for faster turn off and/or lower wakeup latency of serial links. Also, these techniques may provide further improved performance, power saving, and/or heat dissipation when communication amongst coupled agents is sporadic.

More specifically, in one implementation, in the absence of activity on the link, either agent on a link may need to maintain the link state thereby consuming power. Therefore, the I/O (Input/Output) circuits and associated clock circuitry may remain operational. This approach may provide wake latency in the order of 10 s of nanoseconds. However, maintaining I/O circuits and associated clock circuitry can be very power consuming. Another implementation may turn off a physical port (e.g., I/O and clock circuitry as well as internal logic/storage elements that maintain a link active). This approach may have a wakeup latency of several milliseconds. Accordingly, such techniques suffer from performance loss due to long wakeup time, albeit dissipating lower power. Further, turning-off the physical port completely may have impact on other interface layers upstream, such as link layer, protocol layer, etc. Accordingly, some solutions may not have the ability to turn-off power hungry I/O circuits for brief periods of time and resume the link almost instantaneously when link activity is detected.

To this end, an embodiment provides a mechanism to turn-off power consuming I/O drivers, I/O receivers, and/or physical layer clocks while retaining the link state in each agent. As discussed herein, retaining link state of an agent herein generally refers to maintaining the state in all layers above the physically (PHY) including link layer, protocol layer etc. When activity resumes, agents may quickly turn-on I/O and clock circuitry and become operational. In some embodiments, the link resumption time is in the order of 10 microseconds, and does not impact system components outside the link physical layer (e.g., processor/chipset architectural state, display, etc.). Accordingly, such a power savings feature allows products with superior power and/or thermal characteristics. Ability to turn-off the link and resuming activity instantaneously (e.g., 10 microseconds) may result in battery savings for mobile devices. All devices incorporating such features may also dissipate less heat, and hence reduce cost of platform thermal solution.

For example, when a computer is being used in presentation mode, only the display needs to be active all the time. No inter-agent communication over the links interface is required when discussion is focused on a foil (which can last few 10 s of seconds to several minutes). When activity resumes, usually through some form of user interface (e.g., keyboard, mouse, pointer, etc.), the link responds immediately to advance through the presentation. The time required to resume the link, using some embodiments discussed herein, can not be perceptible (10 microseconds) to the human eye.

Various computing systems may be used to implement embodiments discussed herein, such as the systems discussed with reference to FIGS. 1 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIG. 4 or 5. In some embodiments, an agent may be a hardware accelerators (e.g., which may be Field-Programmable Gate Array (FPGA) based). The agent may also be a SoC (System on Chip), MCP (Multi-Chip Package), a tandem/redundant/lock-step agent, system management controllers, combinations thereof, etc.

As illustrated in FIG. 1, the agents 102 may communicate via a network fabric 104. In one embodiment, the network fabric 104 may include a computer network that allows various agents (such as computing devices or their components) to communicate data. Also, the network fabric 104 may include non-electrical media, e.g., fiber-optic links, magnetically coupled links. Moreover, in some embodiments, parts of the network may include links conforming to other protocols for signaling and power-saving. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Generally, cache memory in computing systems may be kept coherent using a snoopy bus or a directory based protocol. In either case, a memory address is associated with a particular location in the system. This location is generally referred to as the "home node" of the memory address. In a directory based protocol, processing/caching agents may send requests to the home node for access to a memory address with which a "home agent" is associated. Additionally, at least of the agents 102 may be a home agent and one or more of the agents 102 may be requesting agents. Further, in an embodiment, one or more of the agents 102 may maintain entries in a storage device (e.g., implemented as a table, queue, buffer, linked list, etc.) to track information about requests. Such storage device may be local (e.g., memory 112-1) to an agent or otherwise accessible by a given agent 102.

Figure 2:
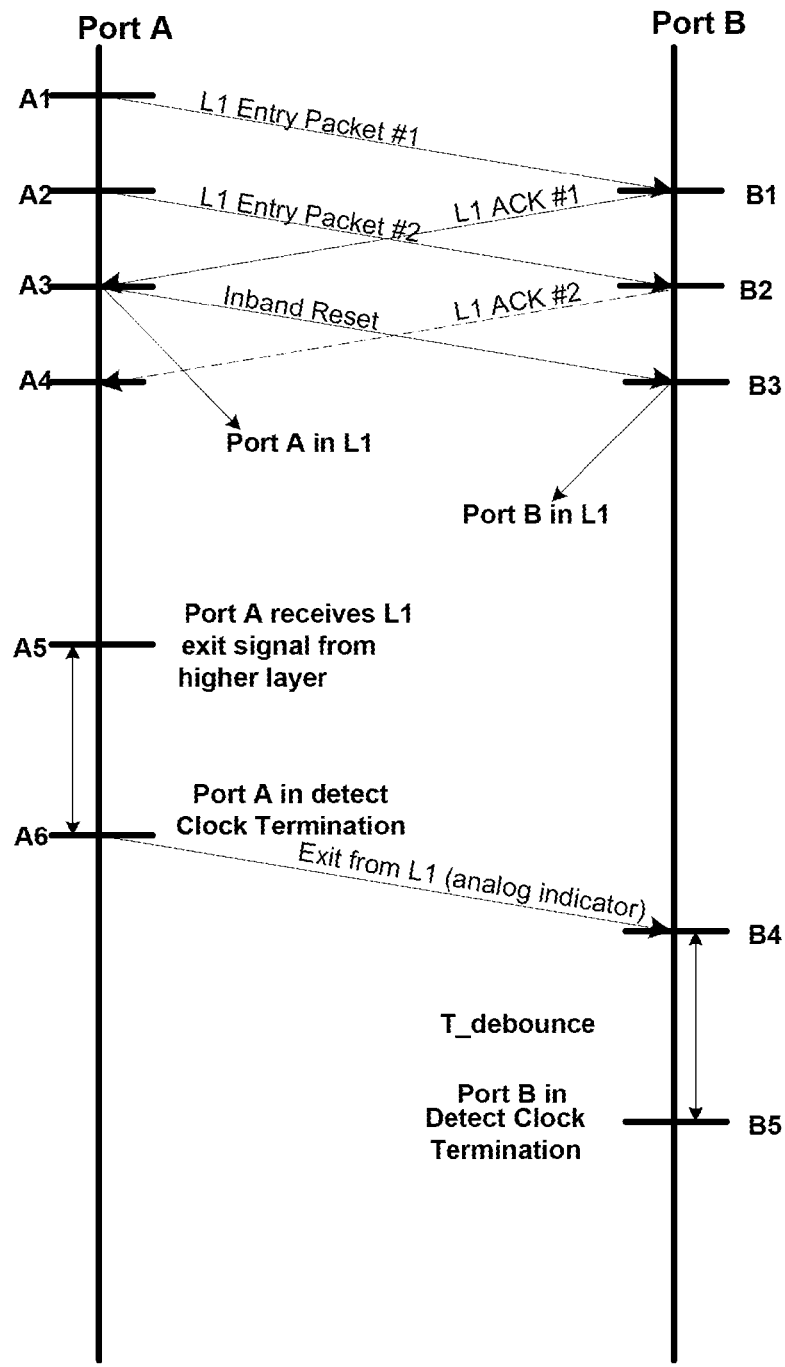
FIG. 2 illustrates a flow diagram of low power entry and exit sequence, according to an embodiment.

FIG. 2 illustrates a flow diagram of low power entry and exit sequence, according to an embodiment. Ports A and B, respectively, refer to ports on two agents coupled via a serial link. In some embodiments, entering and exiting a low power consumption state (referred to herein as "L1" or "Level 1") is controlled by the Link layers of the two agents. Even though FIG. 2 indicates exit from L1 is initiated by the mater (e.g., Port A), exit from L1 may also be initiated by the slave (e.g., Port B) in some embodiments. Moreover, a Link layer protocol is responsible for bringing the Link layers to the threshold of L1 entry and then causing the Physical layers to enter L1. In the L1 master (e.g., Port A), a command (such as LinkEnterL1) may cause the Physical layer to enter L1 and issue an inband reset signal. In the L1 slave (e.g., Port B), a command (such as LinkEnterL1) may cause the Physical layer to enter L1 when it receives this inband reset from the master. Entering L1 causes the slave to issue an inband reset signal to the master in an embodiment. In an embodiment, the two agents may be on different integrated circuit die but in the same package.

Both directions of the link may be used to enter into L1 state. In L1 state, circuits in electrical sub-block are turned-off and logical sub-block is functionally turned off. In some embodiments, electrical circuits/sub-blocks may include sense amplifiers, filters, equalizers, voltage and resistance offsets, phase interpolators, signal drift trackers, phase-locked loop (PLL) clock, etc. Moreover, an embodiment provides a mechanism to turn-off power consuming I/O drivers, I/O receivers, and/or physical layer clocks while retaining the link state in each agent (associated with ports A and B). In some embodiments, power may be maintained to the logical sub-block to ensure Physical layer configuration is not lost during L1. Also, in some embodiments, the Physical layer internal (e.g., phase locked loop (PLL)) clock may be turned off (e.g., by the platform). Prior to entering L1, each port may also configure itself such that calibration is bypassed upon exit from L1 (e.g., for faster power on). In an embodiment, all Rx (Receiver) terminations meet ZRX_HIGH_CM (e.g., high impedance state which the Tx port uses to determine/detect whether a link is down) in L1 state.

As shown in FIG. 2, Link layer on local port A signals (or otherwise indicates to) its Physical layer that an entry into L1 is impending and starts sending out one or more messages (for example in the form of packets) indicating L1 entry, such as Packet #1 or #2 at A1 and A2, respectively, to remote port B. The Link layer on remote port B, after receiving L1 packet(s) at B1 or B2, signals its Physical layer that an entry into L1 is to be expected, and acknowledges local port A's L1 entry request (L1 ACK #1 or #2 messages) at B1 or B2.

When Link layer on local port A receives remote port B's ACK indication/message/signal (e.g., L1 ACK #1 at A3), it instructs local Physical layer of port A to enter L1. Local Physical layer of port A responds to this signal by sending an Inband Reset signal to remote Physical layer of port B at A3 and enters an L1 state. The remote Physical layer interprets this Inband Reset at B3 as an entry in L1 based on a previous signal from port A Link layer and enters L1. At this point, e.g., after A3 for port A and B3 for port B, both port A and port B are in L1 state.

The remote port B may also choose to send NACK (Negative Acknowledgement) in response to an L1 entry request from the local port A, in which case remote Physical layer is not informed of this L1 request. Link layer on the local port A, upon receiving remote NACK, abandons its L1 request and instructs its local Physical layer not to expect an entry into L1 until further notice. The ports continue to remain in current power consumption state (e.g., Level 0 (L0) which generally refers to the normal operation mode).

In some embodiments, Cyclic Redundancy Code (CRC) errors detected by either port after an L1 entry sequence has started would result in both sides ignoring this L1 sequence. For instance, if remote Link layer detected a CRC error either on L1 entry packet or flits prior to it, it sends a retry request to local Link layer. In this case, the remote port is not aware of the L1 request, and hence continues to stay in L0. The local Link layer, upon receiving a retry request, may abandon current L1 sequence and continues to stay in L0. Conversely, if local Link layer sees a CRC error after sending an L1 entry packet, it may abandon the current L1 sequence and send a retry request to remote port. The remote port, which is expecting an Inband Reset signal to enter L1, abandons the current L1 sequence upon seeing this retry request. In some embodiments, when a Link layer abandons its L1 sequence, it instructs the Physical layer accordingly to ensure that a subsequent Inband Reset is not interpreted as an indication to enter L1.

As shown in FIG. 2, exiting from L1 (at A5) is initiated by a higher layer (e.g., the Link layer) and may not occur prior to the detect hold-off period described below. As shown in FIG. 2, at A6, Port A may be in detect clock termination mode (e.g., waiting for signal to exit from L1). Upon exit from L1, at B4, Port B may wait for a period (e.g., T-debounce) before entering into detect clock termination at B5. Since the exit is not accompanied by a platform synchronizing event (like reset) or software re-programming of electrical and logical configuration registers, both agents are expected to maintain correct count of the synchronization counter and the values in their configuration register(s) (e.g., or values stored in memory 112-1) through these states. Implementations may also need alternative timing methods in L1 since link clock may be turned off. For example, implementations may qualify the detection of terminations to avoid spurious exits due to noise (such qualification could be as simple as detecting terminations continuously or for an extended period of time). In an embodiment, Rx terminations (e.g., including clock lane) meet ZRX_HIGH_CM_DC (e.g., high impedance state which the Tx port uses to determine/detect whether a link is down) in L1 state. Since this change on the clock lane will take time (e.g., due to Resistor-Capacitor (RC) charging) to be observed at Tx (Transmit) side detect circuit (see, e.g., FIG. 3 which illustrates a detect hold-off time calculation and sample detect circuit according to some embodiments), the results of detection are ignored for some platform-dependent time.

Figure 3:
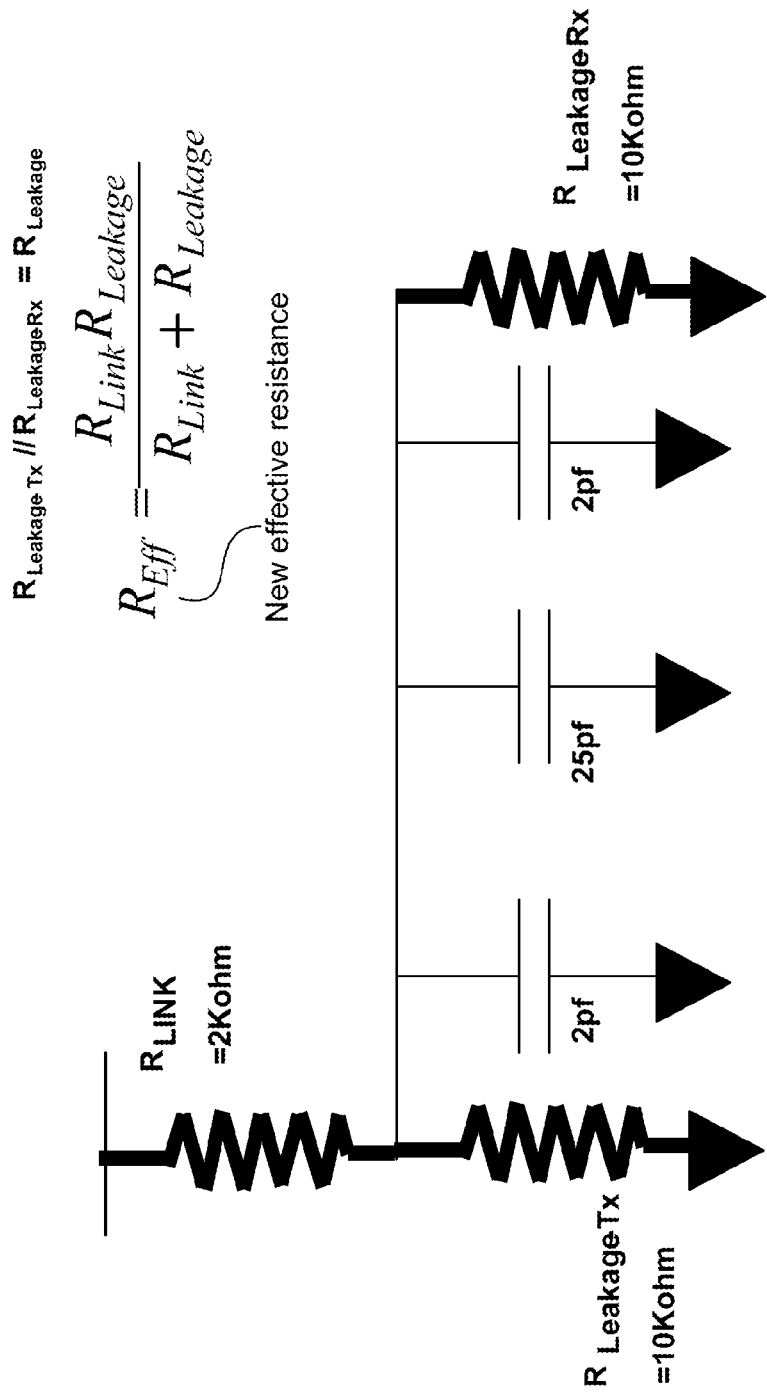
FIG. 3 illustrates a sample detect hold-off time calculation and detect circuit according to some embodiments.

For example, in FIG. 3: assume 2 pf of component capacitance at each end of the clock lane and 25 inches of trace at 1 pf per inch of capacitance with link detection resistor value (Z_tx_link_detect) of 2 Kohm and leakage at each end of 10 Kohm. Allowing for four time constants before observing the voltage level would require a detect hold-off for 4*RC (e.g., 4*(2*5/(5+2))*(2+25+2) or about 165 ns). Note that the final settling voltage=(Reff/R_Link)*Vcc which is lower than Vcc. Therefore users may need to ensure that this is still above their detection threshold.

In an embodiment, exit from L1 to L0 uses the detect scheme used by Physical layer during link initialization. Termination detectors on each port's Tx differential pairs are turned on in L1. A port receiving an implementation specific L1 exit signal would turn-on terminations on clock lane(s)—clock Rx terminations must now meet ZRX_LOW_CM (e.g., low impedance state which the Tx port uses to determine/detect whether a link is up). Termination detectors at clock Tx on remote port may sense Rx clock terminations and use this as an indication to exit from L1.

Figure 4:
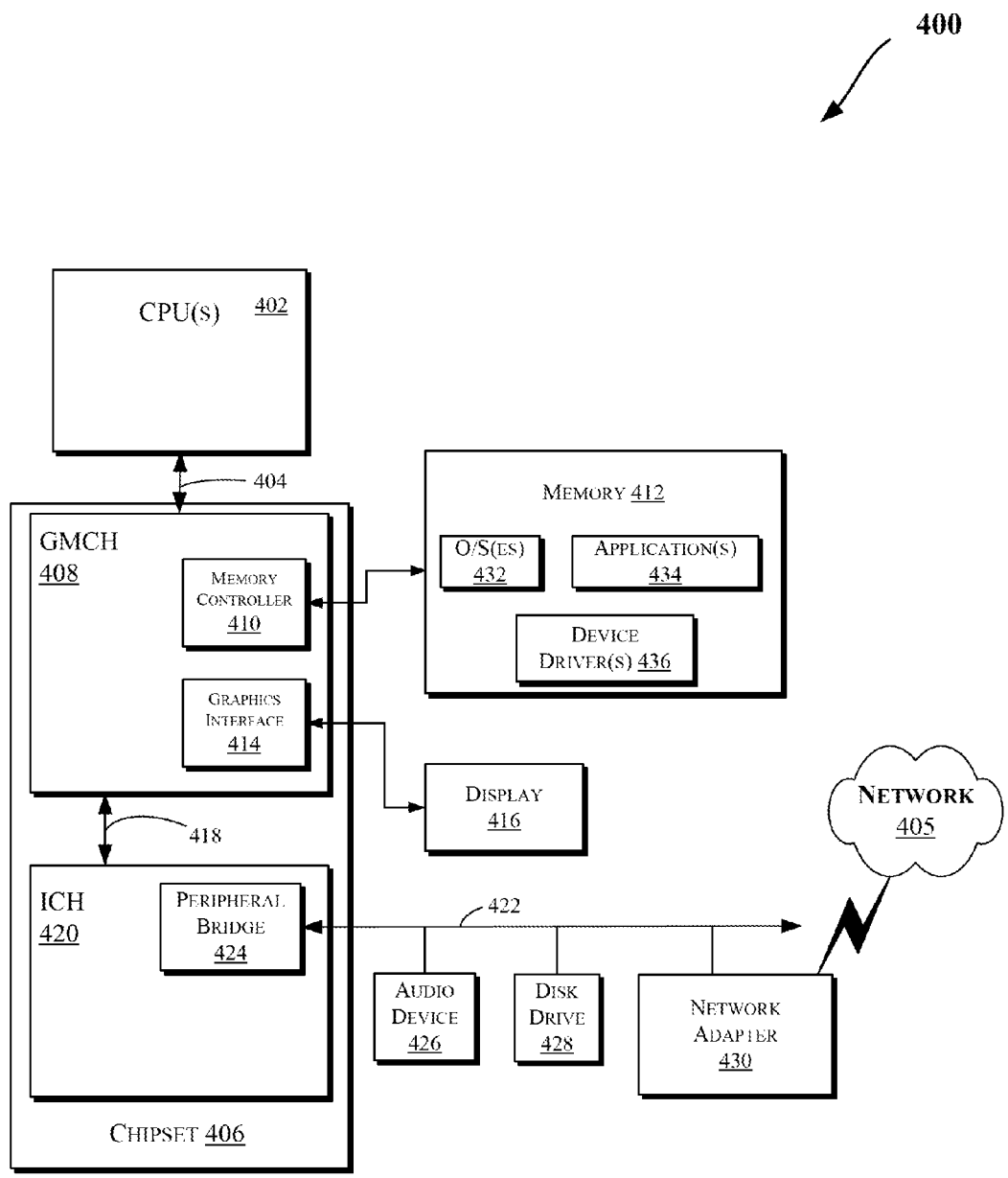

FIG. 4 illustrates a block diagram of an embodiment of a computing system 400. One or more of the agents 102 of FIG. 1 may comprise one or more components of the computing system 400. The computing system 400 may include one or more central processing unit(s) (CPUs) 402 (which may be collectively referred to herein as "processors 402" or more generically "processor 402") coupled to an interconnection network (or bus) 404. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches, which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 400. Additionally, such cache(s) may be located in various locations (e.g., inside other components to the computing systems discussed herein, including systems of FIG. 1 or 5).

A chipset 406 may additionally be coupled to the interconnection network 404. Further, the chipset 406 may include a graphics memory control hub (GMCH) 408. The GMCH 408 may include a memory controller 410 that is coupled to a memory 412. The GMCH may also include one or more memory bridges in some embodiments. The memory 412 may store data, e.g., including sequences of instructions that are executed by the processor 402, or any other device in communication with components of the computing system 400. Also, in one embodiment of the invention, the memory 412 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The GMCH 408 may further include a graphics interface 414 coupled to a display device 416 (e.g., via a graphics accelerator in an embodiment). In one embodiment, the graphics interface 414 may be coupled to the display device 416 via an accelerated graphics port (AGP). In an embodiment of the invention, the display device 416 (such as a flat panel display) may be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 may couple the GMCH 408 to an input/output control hub (ICH) 420. The ICH 420 may provide an interface to input/output (I/O) devices coupled to the computing system 400. The ICH may include one or more host controllers, hubs, and/or bridges in some embodiments. The ICH 420 may be coupled to a bus 422 through a peripheral bridge (or controller) 424, such as a peripheral component interconnect (PCI) bridge that may be compliant with the PCIe specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. Further, the bus 422 may comprise other types and configurations of bus systems. Moreover, other peripherals coupled to the ICH 420 may include, in various embodiments of the invention, integrated drive electronics (IDE), Serial Advanced Technology Attachment (SATA), Solid State Drive (SSD, or small computer system interface (SCSI) drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a NIC in an embodiment). In one embodiment, the network adapter 430 or other devices coupled to the bus 422 may communicate with the chipset 406. Other devices may be coupled to the bus 422. Also, various components (such as the network adapter 430) may be coupled to the GMCH 408 in some embodiments of the invention. In addition, the processor 402 and the GMCH 408 may be combined to form a single chip. In an embodiment, the memory controller 410 may be provided in one or more of the CPUs 402. Further, in an embodiment, GMCH 408 and ICH 420 may be combined into a Peripheral Control Hub (PCH).

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 may include one or more of the following in an embodiment: an operating system (O/S) 432, application 434, and/or device driver 436. The memory 412 may also include regions dedicated to Memory Mapped I/O (MMIO) operations. Programs and/or data stored in the memory 412 may be swapped into the disk drive 428 as part of memory management operations. The application(s) 434 may execute (e.g., on the processor(s) 402) to communicate one or more packets with one or more computing devices coupled to the network 405. In an embodiment, a packet may be a sequence of one or more symbols and/or values that may be encoded by one or more electrical signals transmitted from at least one sender to at least on receiver (e.g., over a network such as the network 405). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 405).

In an embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In an embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers in the memory 412 that are to be processed, e.g., via the protocol stack.

The network 405 may include any type of computer network. The network adapter 430 may further include a direct memory access (DMA) engine, which writes packets to buffers (e.g., stored in the memory 412) assigned to available descriptors (e.g., stored in the memory 412) to transmit and/or receive data over the network 405. Additionally, the network adapter 430 may include a network adapter controller, which may include logic (such as one or more programmable processors) to perform adapter related operations. In an embodiment, the adapter controller may be a MAC (media access control) component. The network adapter 430 may further include a memory, such as any type of volatile/nonvolatile memory (e.g., including one or more cache(s) and/or other memory types discussed with reference to memory 412). Moreover, the network adapter 430 network adapter may include capability for IPC (Inter-Process Communication) and RMA (Remote Memory Access) across the network 405.

Figure 5:
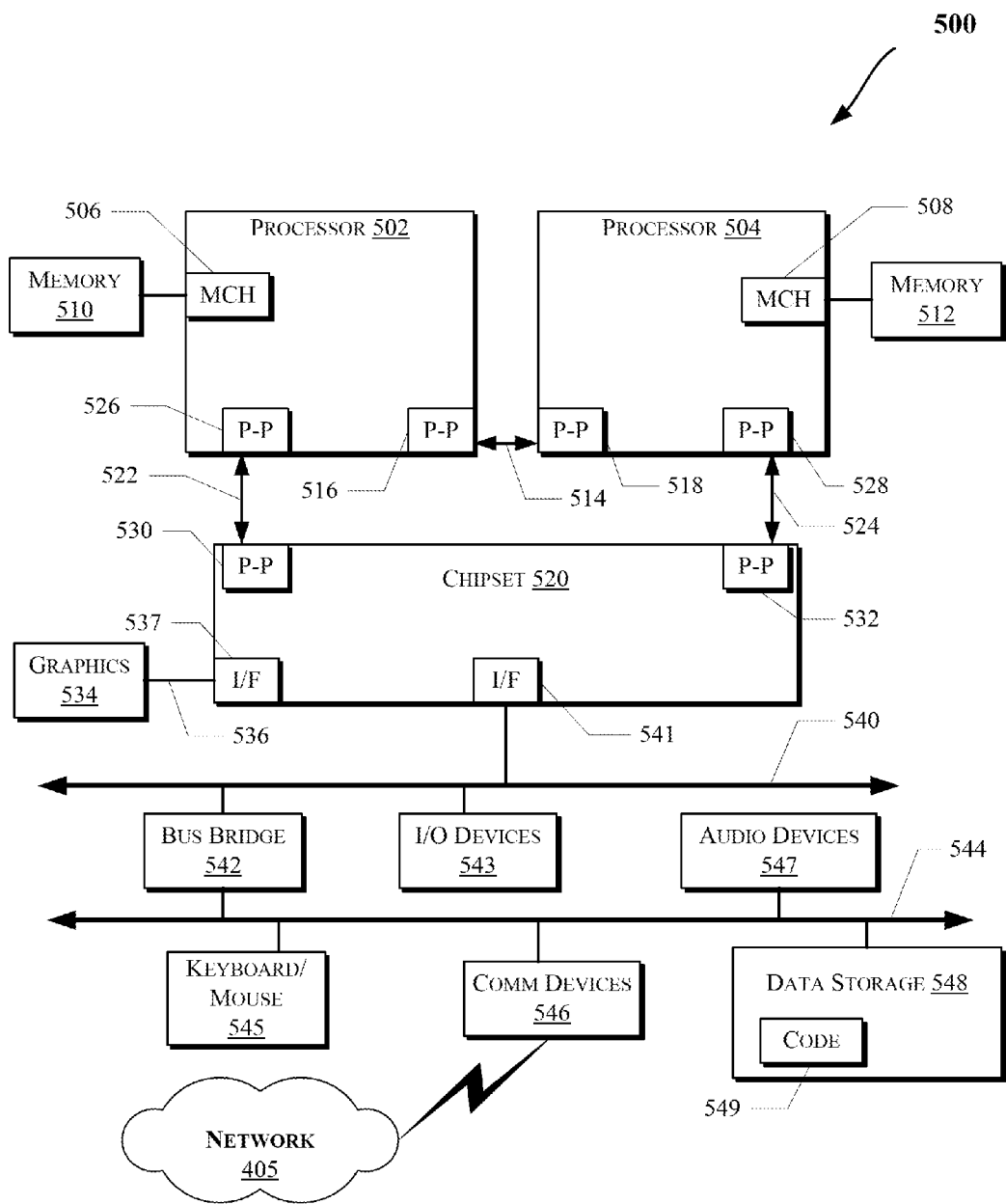

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (GMCH) 506 and 508 to enable communication with memories 510 and 512. The memories 510 and/or 512 may store various data such as those discussed with reference to the memory 412 of FIG. 4. As shown in FIG. 5, the processors 502 and 504 (or other components of system 500 such as chipset 520, I/O devices 543, etc.) may also include one or more cache(s) such as those discussed with reference to FIGS. 1-4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, the agents discussed herein may be present in the processors 502,504 and/or MCH 506,508. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 405), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first agent to be coupled to a second agent via a link, the first agent to:
assert a link entry signal to cause physical layer associated with the first agent to send an in-band reset signal to the second agent; and
enter the low power link state in response to an acknowledgement message to the link entry signal from the second agent;
wherein an electrical sub-block is to be turned off and power is to be maintained at a logical sub-block of the first agent in the low power link state to preserve configuration of the physical layer associated with the first agent.

2. The apparatus of claim 1, wherein the electrical sub-block comprises a phase locked loop (PLL) clock.

3. The apparatus of claim 1, wherein all lane transmitter and receivers and forwarded clocks of the link are to be disabled during the low power link state.

4. The apparatus of claim 1, wherein the low power link state comprises the lowest power state available to the link without removing its power supplies.

5. The apparatus of claim 1, wherein the acknowledgement comprises an in-band reset signal from the physical layer associated with the second agent.

6. The apparatus of claim 1, wherein the second agent is to exit the low power link state in response to a signal from the first agent.

7. The apparatus of claim 1, wherein the first agent is to exit the low power link state in response to a signal from the second agent.

8. The apparatus of claim 1, wherein the first agent is to detect terminations on the link during the low power link state.

9. The apparatus of claim 8, wherein a detect hold-off time is to be applied in the detection of the terminations.

10. The apparatus of claim 8, wherein the first agent is further to qualify detection of the terminations.

11. The apparatus of claim 1, wherein both directions of the link are to enter the low power link state.

12. The apparatus of claim 1, wherein the second agent is transmit the acknowledgement message in response to entry of a physical layer associated with the second agent into the low power link state.

13. An apparatus comprising:
a controller to interface between at least a first processor to recognize a first instruction set and second processor to recognize a second instruction set that is different from the first instruction set, the controller comprising interface logic to couple to a link comprising a plurality of lanes;
the interface logic to:
send a link entry signal to indicate that a physical layer is to enter a low power link state, wherein the low power link state comprises a lowest power state available to the link without removing power supplies to the link; and
enter the low power link state in response to an acknowledgement to the link entry signal, wherein an electrical sub-block of the physical layer is to be turned off and a logical sub-block of the physical layer is to be functionally shut down with power maintained at the logical sub-block in the low power link state to preserve configuration of the physical layer.

14. A method comprising:
asserting a link entry signal to cause a physical layer associated with a first agent to enter a low power link state and send an in-band reset signal to a second agent;
receiving an acknowledgment from the second agent, wherein the second agent is to transmit the acknowledgement message in response to a physical layer associated with second agent entering the low power link state; and
causing the first agent to enter the low power link state in response to the acknowledgement;
wherein an electrical sub-block is to be turned off and power is to be maintained at a logical sub-block of the first agent in the low power link state to preserve configuration of the physical layer associated with the first agent.

15. A system comprising:
a first agent; and
a second agent communicatively coupled to the first agent via a serial data link;
wherein the first agent is to send a signal to the second agent to indicate an attempt to enter a low power link state, the second agent is to enter the low power link state based on the signal and send an acknowledgment to the first agent, and the first agent is to enter the low power link state based on the acknowledgment, wherein clock circuitry of the first agent is to be turned-off and power is to be maintained at a logical sub-block of the first agent to maintain configuration of a physical layer of the first agent during the low power link state.

16. The system of claim 15, wherein the first and second agents are agents on a same computing chip package.

17. The system of claim 16, wherein the first and second agents are agents on a same die on the computing chip package.

18. The system of claim 16, wherein the first and second agents are agents on different die on the computing chip package.

19. The system of claim 15, wherein the first and second agents each comprise respective physical layer logic and respective link layer logic.

20. The system of claim 19, wherein entry and exit of the low power link state is to be initiated by the link layer logic.

* * * * *